United States Patent
Iriki

(10) Patent No.: US 12,326,427 B2
(45) Date of Patent: Jun. 10, 2025

(54) PREPARATIVE FLUID CHROMATOGRAPH DEVICE

(71) Applicant: SHIMADZU CORPORATION, Kyoto (JP)

(72) Inventor: Takayuki Iriki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 403 days.

(21) Appl. No.: 18/097,707

(22) Filed: Jan. 17, 2023

(65) Prior Publication Data

US 2023/0251232 A1      Aug. 10, 2023

(30) Foreign Application Priority Data

Feb. 10, 2022   (JP) .................. 2022-019551

(51) Int. Cl.
*G01N 30/86*   (2006.01)
*B01D 15/14*   (2006.01)
(Continued)

(52) U.S. Cl.
CPC ......... *G01N 30/8631* (2013.01); *B01D 15/14* (2013.01); *G01N 30/14* (2013.01); *G01N 30/16* (2013.01); *G01N 2030/027* (2013.01)

(58) Field of Classification Search
CPC .. G01N 30/06; G01N 2030/027; G01N 30/08; G01N 30/80; G01N 30/82;
(Continued)

(56) References Cited

U.S. PATENT DOCUMENTS

| | | | |
|---|---|---|---|
| 2019/0391117 A1* | 12/2019 | Yamazaki | G01N 30/84 |
| 2020/0033303 A1 | 1/2020 | Tamaoki et al. | |
| 2021/0310997 A1* | 10/2021 | Yamazaki | G01N 30/06 |

FOREIGN PATENT DOCUMENTS

WO      2018/185872 A1      10/2018

\* cited by examiner

*Primary Examiner* — Kristina M Deherrera
*Assistant Examiner* — Gedeon M Kidanu
(74) *Attorney, Agent, or Firm* — Renner, Otto, Boisselle & Sklar, LLP

(57) ABSTRACT

A fraction collector (14) that is provided downstream of a detector (10) and for separating an eluate eluted from a separation column (8) into a plurality of parts and collecting each of the parts into a plurality of containers respectively, and a controller (16) configured to execute fractionation operation for each sample injected at one time into the mobile phase are provided. In the fractionation operation, the controller detects components separated from each other in the separation column (8) as peaks individually based on a signal output from the detector (10), and controls operation of the fraction collector (14) such that the components detected as the peaks are collected in different containers. The controller (16) is configured to set a reference number of the number of components in a sample injected into the mobile phase, to count the number of components detected as the peaks for each sample injected into the mobile phase at a time by the injector (6), and to determine that the fractionation operation of the sample is completed when the number of components counted reaches the reference number and all components as many as the reference number are collected in the container.

5 Claims, 2 Drawing Sheets

(51) Int. Cl.
*G01N 30/02* (2006.01)
*G01N 30/14* (2006.01)
*G01N 30/16* (2006.01)

(58) Field of Classification Search
CPC ............. G01N 30/84; G01N 2030/062; G01N 2030/065; G01N 2030/146; G01N 2030/201; G01N 2030/202; G01N 2030/324; G01N 2030/8411; G01N 30/04; G01N 30/26; G01N 30/32; G01N 30/34; G01N 30/44; G01N 30/46; G01N 30/463; G01N 30/466; G01N 30/62; G01N 30/8665; G01N 30/88; G01N 35/1065

See application file for complete search history.

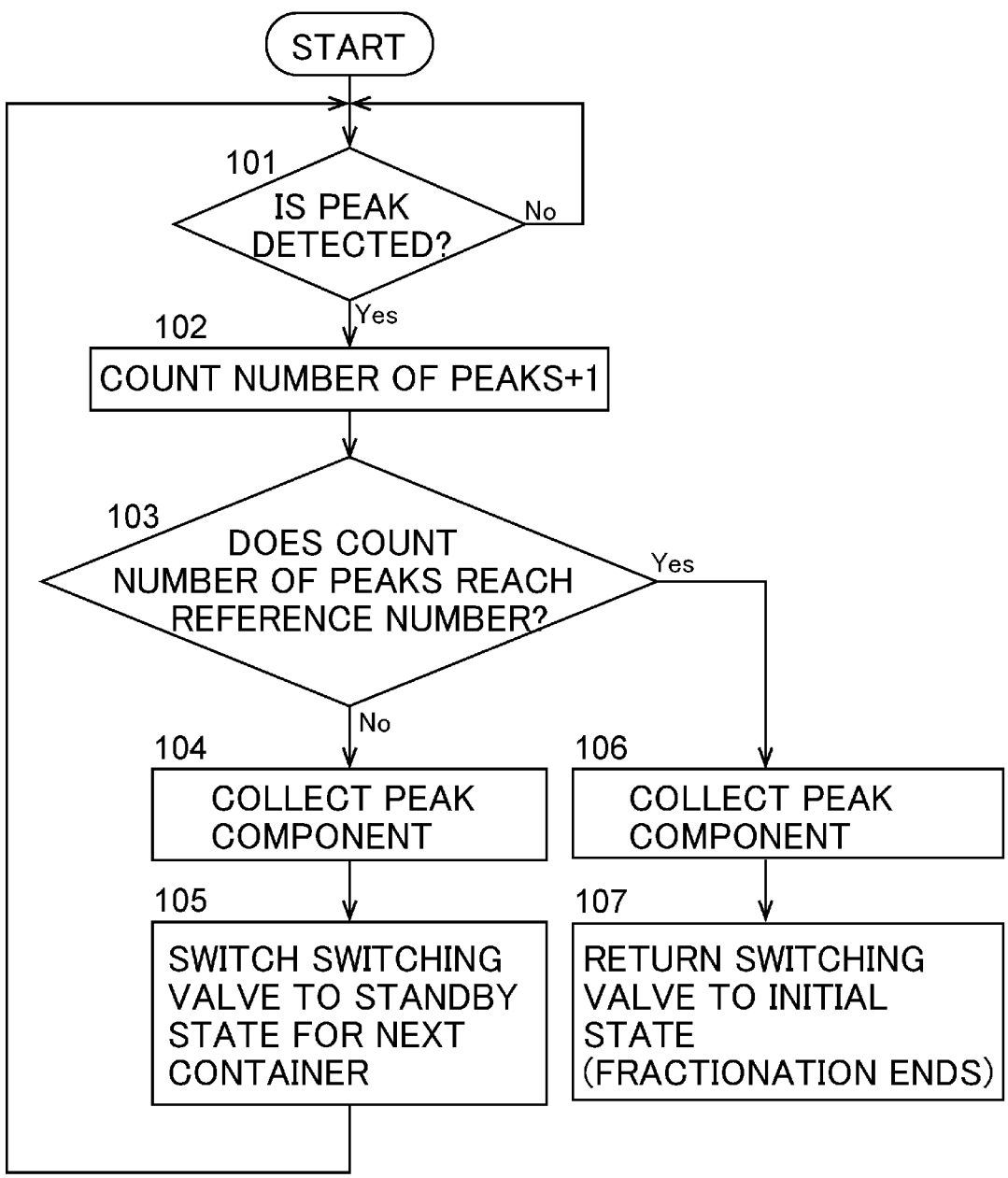

PREPARATIVE FLUID CHROMATOGRAPH DEVICE

BACKGROUND OF THE INVENTION

1. Field of the Invention

The present invention relates to a preparative fluid chromatograph device including a preparative liquid chromatograph device (hereinafter, referred to as preparative LC) and a supercritical fluid chromatograph device (hereinafter, referred to as preparative SFC).

2. Description of the Related Art

A preparative LC and a preparative SFC are devices that separate components in a sample from each other by chromatography using liquid or supercritical fluid, and collect the separated individual components in individual containers by a fraction collector (see WO 2018/185872 A). The fraction collector is controlled so as to sequentially collect components eluted from a separation column and detected as peaks in a signal of a detector in separate containers.

In a case where a large amount of components is collected using a preparative fluid chromatograph device, what is called stack injection in which the same sample is injected into a mobile phase a plurality of times at regular time intervals so that components of the sample injected at different timings do not overlap each other is performed. In this case, a fraction collector repeats the same collection operation for each sample injected at different timings so that the same component in the sample is collected in the same container.

SUMMARY OF THE INVENTION

In a conventional preparative fluid chromatograph device, the user generally sets time required for collecting all components of one sample (sample injected at a time into a mobile phase) (hereinafter, referred to as end time) to a device. In such a specification, when the set end time elapses after a sample is injected, a fraction collector terminates fractionation operation being executed, and shifts to preparation operation for fractionating a next sample. However, the set end time may be different from actual time required to collect all components. In such a case, the end time is reached while the fraction collector is collecting a component in a container, and there arises a problem that fractionation operation of the sample ends while a part of the component is not collected, or an error occurs in a system. Further, in a case where fractionation operation is repeated by stack injection, if actual time required for collecting all components is different from set end time, there may be a problem that components are collected in an unexpected container.

The present invention has been made in view of the above problem, and an object of the present invention is to reliably collect all components to be collected in a container.

A preparative fluid chromatograph device according to the present invention includes a separation channel through which a mobile phase flows, an injector configured to inject a sample into the mobile phase flowing through the separation channel, a separation column that is provided downstream of the injector on the separation channel and for separating a plurality of components in the sample injected into the mobile phase by the injector from each other, a detector that is provided downstream of the separation column on the separation channel and outputs a signal corresponding to concentration of the components eluted from the separation column, a fraction collector that is provided downstream of the detector, and for separating an eluate eluted from the separation column into a plurality of parts and collecting each of the parts into a plurality of containers respectively, and a controller configured to execute fractionation operation for each sample injected at one time into the mobile phase, wherein in the fractionation operation, the controller detects the components separated from each other in the separation column as peaks individually based on the signal output from the detector, and controls operation of the fraction collector such that the components detected as the peaks are collected in different containers. The controller is configured to set a reference number of the number of components in a sample injected into the mobile phase, count the number of components detected as the peaks for each sample injected into the mobile phase at a time by the injector, and to determine that the fractionation operation of the sample is completed when the number of components counted reaches the reference number and all components as many as the reference number are collected in the container.

In the preparative fluid chromatograph device according to the present invention, the number of components in a sample is set as a reference number, and after fractionation operation of the sample is actually started, for each sample injected at a time into a mobile phase, the number of components detected as a peak is counted until the number reaches the reference number, and when all components counted up to the reference number are collected in a container, the fractionation operation of each sample is determined to be completed, so that all the components to be collected can be reliably collected in the container.

BRIEF DESCRIPTION OF THE DRAWINGS

FIG. 2 is a flowchart illustrating an example of fractionation operation of the embodiment.

DETAILED DESCRIPTION OF THE INVENTION

Figure 1:
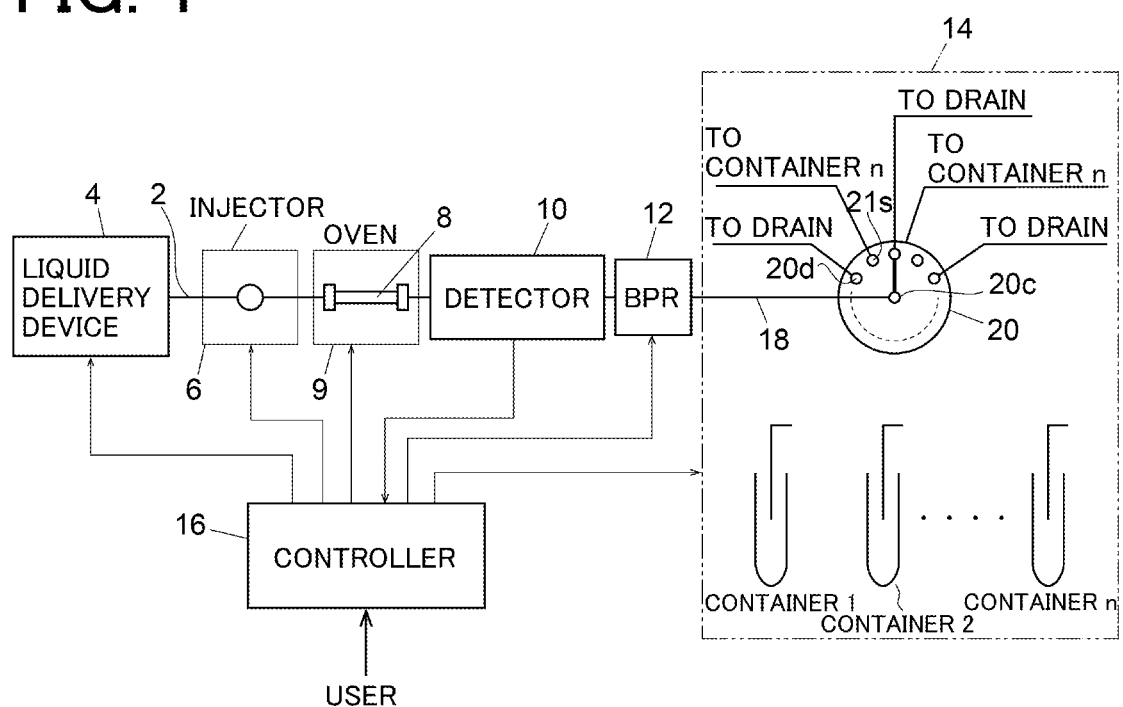
FIG. 1 is a configuration diagram illustrating an embodiment of a preparative fluid chromatograph device.

Hereinafter, an embodiment of a preparative fluid chromatograph according to the present invention will be described with reference to the accompanying drawings.

As illustrated in FIG. 1, the preparative fluid chromatograph of the present embodiment is a preparative SFC, and includes a liquid delivery device 4, an injector 6, a separation column 8, an oven 9, a detector 10, a back pressure controller (BPR) 12, a fraction collector 14, and a controller 16.

The liquid delivery device 4 feeds mixed liquid of liquefied carbon dioxide and a modifier in a separation channel 2. The injector 6 injects a sample into a mobile phase flowing through the separation channel 2. The separation column 8 is provided downstream of the injector 6 on the separation channel 2 to separate components of a sample injected into a mobile phase by the injector 6 from each other. The separation column 8 is accommodated in the oven 9, and temperature of the separation column 8 is controlled to a set temperature. The detector 10 is provided downstream of the separation column 8 on the separation channel 2, and outputs a signal corresponding to concentration of individual components separated from each other in the separation column 8. The BPR 12 is provided at a downstream end of the separation channel 2 and controls pressure in the separation channel 2 to a set pressure. When the inside of the separation channel 2 is brought into a high pressure state by the BPR 12, carbon dioxide in a mobile phase flows in the separation column 8 in a supercritical state.

The fraction collector 14 is connected to an outlet channel 18 of the BPR 12. The fraction collector 14 includes a switching valve 20 for switching a connection destination of the outlet channel 18, and a plurality of containers 1 to n for collecting individual components separated from each other by the separation column 8. The switching valve 20 includes a central common port 20c to which the outlet channel 18 is connected, a plurality of container ports 20s communicating with the containers 1 to n, and a plurality of drain ports 20d communicating with the drain. The container ports 20s and the drain ports 20d are alternately arranged on the same circumference around the common port 20c. In FIG. 1, the switching valve 20 is in a state of connecting the common port 20c to the drain port 20d between the container port 20s leading to the container 1 and the container port 20s leading to the container n. In the present embodiment, this state is an initial state of the switching valve 20. By switching the switching valve 20 clockwise from this initial state, the outlet channel 18 can be connected to the drain, the container 1, the drain, the container 2, . . . , the drain, and the container n in this order.

The controller 16 controls operation of the liquid delivery device 4, the injector 6, the oven 9, the BPR 12, and the fraction collector 14. The controller 16 can be realized by an electronic circuit including a central processing unit (CPU) and the like. The controller 16 reads an output signal of the detector 10 and detects individual components eluted from the separation column 8 as peaks, and controls operation of the fraction collector 14 to sequentially collect each of the components detected as peaks in separate containers.

Here, the controller 16 is configured to determine a timing at which fractionation operation for one sample (sample injected at a time by the injector 6) ends based on the number of components detected as peaks. The controller 16 has a function of setting a reference number for the number of components in one sample in advance. In general, in a preparative LC and a preparative SFC, in order to set fractionation conditions such as an injection timing of a sample in stack injection, a sample to be fractionated is injected and preliminary analysis is performed before fractionation of the sample is started. The number of components in a sample to be fractionated can be acquired from analysis data obtained in the preliminary analysis. The number of components in a sample to be fractionated can be acquired by the user from analysis data, or can be automatically obtained by the controller 16 counting the number of peaks in a chromatogram. In a case where the user obtains the number of components in a sample to be fractionated, the controller 16 prompts the user to input a numerical value to be a reference number after the preliminary analysis ends, and sets the numerical value input by the user as the reference number.

In fractionation operation of one sample, the controller 16 counts the number of components detected as peaks up to the reference number, determines that the fractionation operation of the sample ends at a timing when all components counted up to the reference number are collected in a container, and causes the fraction collector 14 to execute end operation of the fractionation operation. Examples of the end operation of fractionation operation include operation of returning the switching valve 20 to the initial state (the state of FIG. 1). For example, in a case where the reference number is set to m, the switching valve 20 is returned to the initial state at a timing when all components detected as an m-th peak for a sample injected at a certain timing are collected in an individual container.

An example of fractionation operation of a sample will be described with reference to a flowchart of FIG. 2 together with FIG. 1. Operation described below is executed for each sample (sample injected at a time by the injector 6).

The switching valve 20 starts from the initial state at a drain port, and when a sample is injected by the injector 6, the controller 16 monitors an output signal from the detector 10 and counts the number of components detected as peaks for the sample (Steps 101 and 102).

In a case where a count number of peaks does not reach a preset reference number (Step 103: No), the controller 16 collects a detected peak component in a container by shifting the switching valve 20 of the fraction collector 14 clockwise by one position (Step 104), and then further shifts the switching valve 20 clockwise by one position to switch the switching valve 20 to a standby state for a next container (that is, a state of being connected to the drain port 20d before the container port 20s leading to a container where a next component is to be collected) (Step 105).

On the other hand, in a case where the count number of peaks reaches the preset reference number (Step 103: Yes), the controller 16 collects a detected peak component in a container by shifting the switching valve 20 of the fraction collector 14 clockwise by one position (Step 106), and then returns the switching valve 20 to the initial state (the state of FIG. 1) (Step 107).

As described above, in the present embodiment, since fractionation operation for one sample is reliably continued until all components as many as a reference number set in advance based on analysis data obtained in preliminary analysis are collected in each container, there is no problem that the switching valve 20 is returned to the initial state at a stage where collection of components is not completed.

Further, in a case where stack injection is executed, the same peak component can be collected in the same container by as Steps 101 to 107 are repeated for a next sample after the switching valve 20 is returned to the initial state. According to this method, even in a case where time required for collecting a component in one injection of a sample is different from expectation, the same component can be reliably collected in the same container without next collection is affected. The same peak component means components in the same place in order of being detected as peaks during fractionation operation for each sample. That is, all components detected as a first peak after start of fractionation operation for each sample are collected in the container 1, all components detected as a second peak are collected in the container 2, and components detected as an m-th peak are collected in the container m.

Note that, in the above embodiment, a preparative SFC is described as an example, but the present invention can be similarly applied to a preparative LC.

Further, the fraction collector 14 of the above embodiment is configured to switch a container in which each component is to be collected by switching the switching valve 20, but the present invention is not limited to this configuration. For example, a plurality of switching valves may be combined so as to perform a function equivalent to that of the switching valve 20, or a nozzle for dropping an eluate may be moved above a desired container so that a container for collecting each component is switched.

The above embodiment is merely an example of an embodiment of the preparative chromatograph device according to the present invention. The embodiment of the preparative chromatograph device according to the present invention is as described below.

An embodiment of a preparative chromatograph device according to the present invention includes a separation channel through which a mobile phase flows, an injector configured to inject a sample into the mobile phase flowing through the separation channel, a separation column that is provided downstream of the injector on the separation channel and for separating a plurality of components in the sample injected into the mobile phase by the injector from each other, a detector that is provided downstream of the separation column on the separation channel and outputs a signal corresponding to concentration of the components eluted from the separation column, a fraction collector that is provided downstream of the detector, and for separating an eluate eluted from the separation column into a plurality of parts and collecting each of the parts into a plurality of containers respectively, and a controller configured to execute fractionation operation for each sample injected at one time into the mobile phase, wherein in the fractionation operation, the controller detects the components separated from each other in the separation column as peaks individually based on the signal output from the detector, and controls operation of the fraction collector such that the components detected as the peaks are collected in different containers. The controller is configured to set a reference number of the number of components in a sample injected into the mobile phase, to count the number of components detected as the peaks for each sample injected into the mobile phase at a time by the injector, and to determine that the fractionation operation of the sample is completed when the number of components counted reaches the reference number and all components as many as the reference number are collected in the container.

In a first aspect of the embodiment, the controller is configured to request the user to input a numerical value to be the reference number, and to set the numerical value input by the user as the reference number.

Further, in a second aspect of the embodiment, the controller is configured to read the number of components in a sample to be fractionated from analysis data obtained by preliminary analysis executed in advance for the sample, and to set the read number of components as the reference number.

Further, in a third aspect of the embodiment, the controller is configured to return the fraction collector to an initial state, which is a state when the fractionation operation is started, when determining that the fractionation operation is completed. According to such an aspect, it is possible to quickly shift to fractionation operation of a sample injected next.

In the third aspect, in a case of executing stack injection of injecting a same sample into the mobile phase a plurality of times, the controller can be configured, after setting the fraction collector to the initial state, to execute the fractionation operation of each sample injected into the mobile phase, and to control the fraction collector so that same components among components of each sample injected into the mobile phase are collected in the same container. This makes it possible to prevent influence on fractionation operation of a next sample even in a case where time required for fractionation operation of one sample is different from expectation when stack injection is executed, and to reliably collect the same components among samples injected into a mobile phase in the same container.

DESCRIPTION OF REFERENCE SIGNS

2: separation channel
4: liquid delivery device
6: injector
8: separation column
9: oven
10: detector
12: BPR
14: fraction collector
16: controller
18: outlet channel
20: switching valve

What is claimed is:

1. A preparative fluid chromatograph device comprising:
a separation channel through which a mobile phase flows;
an injector configured to inject a sample into the mobile phase flowing through the separation channel;
a separation column that is provided downstream of the injector on the separation channel and for separating a plurality of components in the sample injected into the mobile phase by the injector from each other;
a detector that is provided downstream of the separation column on the separation channel and outputs a signal corresponding to concentration of the components eluted from the separation column;
a fraction collector that is provided downstream of the detector, and for separating an eluate eluted from the separation column into a plurality of parts and collecting each of the parts into a plurality of containers respectively; and
a controller configured to execute fractionation operation for each sample injected at one time into the mobile phase, wherein in the fractionation operation, the controller detects the components separated from each other in the separation column as peaks individually based on the signal output from the detector, and controls operation of the fraction collector such that the components detected as the peaks are collected in different containers,
wherein the controller is configured to set a reference number of the number of components in a sample injected into the mobile phase, to count number of components detected as the peaks for each sample injected into the mobile phase at a time by the injector, and to determine that the fractionation operation of the sample is completed when the number of components counted reaches the reference number and all components as many as the reference number are collected in the container.

2. The preparative fluid chromatograph device according to claim 1, wherein the controller is configured to request a user to input a numerical value to be the reference number, and to set the numerical value input by the user as the reference number.

3. The preparative fluid chromatograph device according to claim 1, wherein the controller is configured to read number of components in a sample to be fractionated from analysis data obtained by preliminary analysis executed in advance for the sample, and to set the read number of components as the reference number.

4. The preparative fluid chromatograph device according to claim 1, wherein the controller is configured to return the fraction collector to an initial state, which is a state when the fractionation operation is started, when determining that the fractionation operation is completed.

5. The preparative fluid chromatograph device according to claim 4, wherein in a case of executing stack injection of injecting a same sample into the mobile phase a plurality of times, the controller is configured, after setting the fraction collector to the initial state, to execute the fractionation operation of each sample injected into the mobile phase, and to control the fraction collector so that same components among components of each sample injected into the mobile phase are collected in a same container.

* * * * *